Figure 1:
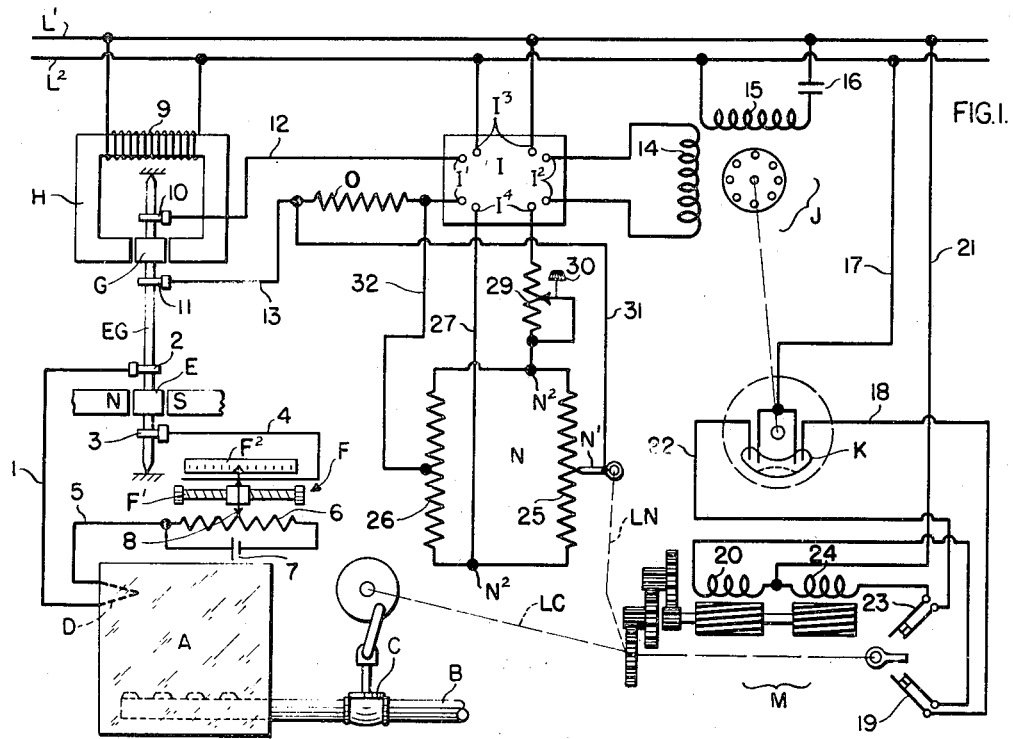

Jan. 23, 1945. H. S. JONES 2,367,869
CONTROL APPARATUS
Filed June 12, 1942

INVENTOR.
HARRY S. JONES
BY C. B. Spangenberg
ATTORNEY

Patented Jan. 23, 1945

2,367,869

UNITED STATES PATENT OFFICE 2,367,869

CONTROL APPARATUS

Harry S. Jones, Washington, D. C., assignor to The Brown Instrument Company, Philadelphia, Pa., a corporation of Pennsylvania Application June 12, 1942, Serial No. 446,829

4 Claims. (Cl. 172—239)

The general object of the present invention is to provide a simple and effective control system of the proportioning type including regulating means comprising a fuel valve or analogous regulator and a relay motor, and novel control means through which the motor is actuated to give said regulator adjustments corresponding in direction and magnitude to variations in a small controlling E. M. F. The latter may be the voltage of a thermo-couple or the measuring voltage of electric measuring apparatus employed to measure a pressure, a fluid rate of flow, or other physical condition or quantity.

My invention comprises means through which an A. C. voltage varying in magnitude and phase with the departure of a control condition from a normal value thereof is impressed on an electronic amplifier and through the latter causes a relay motor to adjust a regulator into an adjustment position selectively dependent upon the direction and magnitude of said departure and comprises means through which said relay establishes a second alternating current voltage which is opposite in phase to the first mentioned A. C. voltage, and varies in magnitude with the extent of adjustment of said regulator away from a normal position thereof, and is also impressed on said amplifier, so that the latter will interrupt the operation of the relay motor when the two voltages become equal in magnitude.

When the controlling E. M. F. is a thermo-couple voltage or other minute D. C. voltage I advantageously use a so-called A. C.-D. C. galvanometer of known type, comprising an element deflecting in accordance with the departure of the controlling E. M. F. from a normal or predetermined value of the latter to angularly adjust a coil in an A. C. energized electro-magnetic field and thereby produce a minute alternating current which varies in phase and magnitude with the direction and extent of the deflection of said element and is impressed on the amplifier through which the relay motor is controlled.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described a preferred embodiment of the invention.

Figure 2:
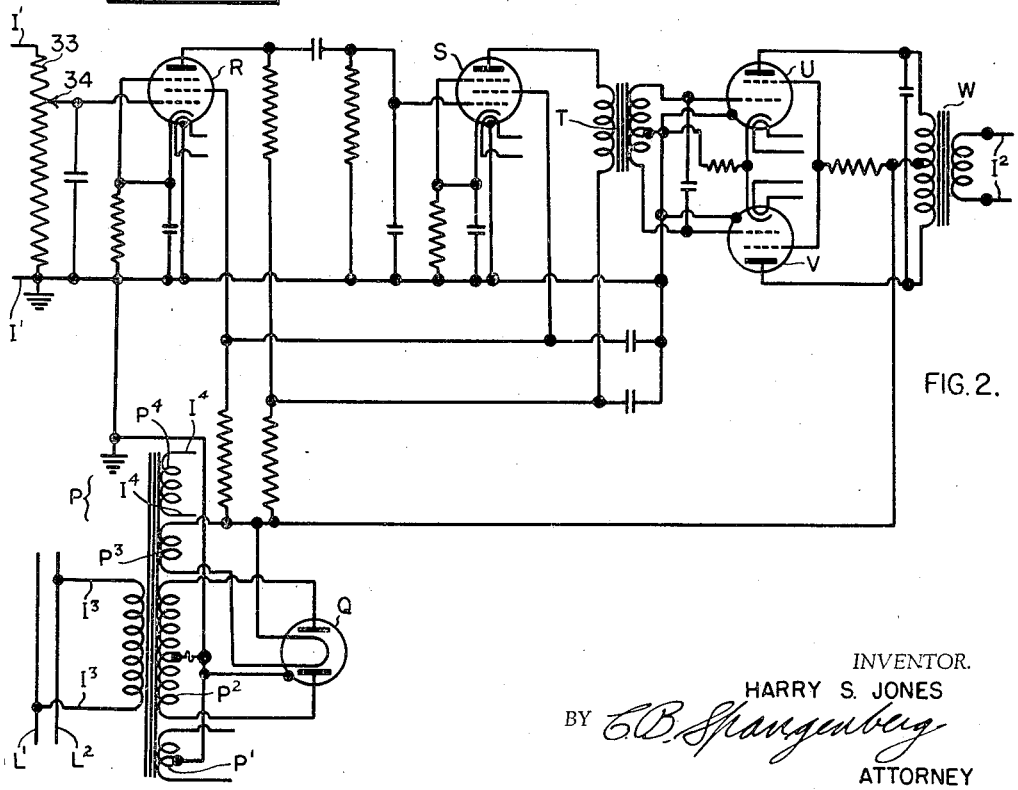

Of the drawing:

Fig. 1 is a diagrammatic representation of a preferred form of my improved control system; and Fig. 2 is a diagram illustrating the details of an electronic amplifying means included in the apparatus shown diagrammatically in Fig. 1.

In Fig. 1 I have illustrated the use of my invention in controlling the supply of fuel to a furnace A through a fuel supply pipe B by adjustment of a fuel valve C in accordance with variations in the furnace temperature to which a thermo-couple D is responsive, to the end of maintaining an approximately constant furnace temperature.

The temperature to which the thermo-couple D is responsive is measured and indicated by a so-called A. C.-D. C. galvanometer, comprising a deflecting element EG which includes a D. C. coil E and deflects in accordance with variations in the direct current voltage impressed on the terminals of that coil. One of said terminals is connected through a conductor 1 and slip ring 2 to one terminal of the thermo-couple D. The second terminal of the coil E is connected through a slip ring 3, conductor 4, potentiometer F and conductor 5 to the second terminal of the thermo-couple D. The potentiometer F comprises a potentiometer resistor 6 energized by a source of direct current 7, and to one end of which the conductor 5 is directly connected. A slider contact 8 engaging and adjustable along the resistor 6 is connected to the conductor 4.

As diagrammatically shown, the potentiometer includes a threaded spindle F' which is manually rotatable to adjust the contact 8 along the resistor 6, and includes a scale F² on which the adjustment position of the contact 8 is indicated. That adjustment position fixes the control point or furnace temperature which the control apparatus is adjusted to maintain, and at which the galvanometer element EG occupies a neutral position from which it deflects on and in accordance with any departure of the actual temperature of the thermo-couple D from the normal value thereof which is predetermined by the adjustment of the contact 8 into its said adjustment position.

The deflecting galvanometer element EG supports an A. C. coil G in which an alternating voltage is induced by the inter-action of the coil G and an electro-magnetic field element H with A. C. excitation, when the deflection of the element E G holds said coil out of its neutral position. The alternating current voltage then induced in the coil G is proportional in magnitude to the deflection of the element EG from its neutral position, and the voltage induced in the coil G when the element deflects in one direction from its neutral position varies 180 degrees in phase from the voltage induced in the coil when the element EG deflects in the opposite direction from its neutral position. The electro-magnetic field element H includes an A. C. energizing coil 9. The terminals of the coil G are connected to the input terminals I' of an electronic amplifier I, by means comprising slip rings 10 and 11 carried by the element EG and conductors 12 and 13, the latter including the resistor O hereinafter referred to.

The amplifier I, which may be of any usual or suitable type, is shown as having its output terminals I² connected to the terminals of one winding 14 of a switch actuating, or control motor J, which has a second winding 15. The motor J is of a known type adapted to operate in one direction or the other accordingly as the current flow in the winding 14 lags or leads the current flow in the winding 15 of the motor.

When, as a result of current flow through the motor coil 14, the rotor of the motor J turns in one direction or the other from a neutral position into which it is biased, it tilts a mercury switch K away from its neutral position in one direction or the other, and thereby operatively connects the relay motor M to A. C. supply conductors L' and L².

The alternating current supply conductors L' and L² are connected to and supply current to the energizing coil 9 of the electro-magnetic field H, and to the terminals I³ of the amplifier I, and thereby, as hereinafter explained, the conductors L' and L² energize the primary winding of a transformer element of the amplifier which has a plurality of secondary windings, the terminals of one of which are connected to and thereby energize the amplifier terminals I⁴.

When the motor J oscillates the switch K in the clockwise direction, it connects conductors 17 and 18 and thereby energizes a reversible electric relay motor M for rotation in one direction through a circuit including conductors 17 and 18. The conductor 17 is connected at one end to a terminal of the switch K and at the other end to the supply conductor L². The conductor 18 connects a terminal of the switch K through a limit switch 19, when the latter is closed, to one terminal of an energizing winding 20 of the motor M. The second terminal of the coil 20 is connected by a conductor 21 to the supply conductor L'. When the switch K is turned counter-clockwise from its neutral position, it connects the conductor 17 to a conductor 22. The latter connects a terminal of the switch K through a limit switch 23 when the latter is closed, to one terminal of an energizing winding 24 of the motor M. The last mentioned coil has its second terminal connected to the supply conductor L' through the previously mentioned conductor 21.

As will be understood, the motor M rotates in one direction when its winding 20 is energized, and rotates in the opposite direction when its winding 24 is energized. The rotation of the motor M adjusts the valve C and a slider contact N' through connections LC and LN, respectively, as diagrammatically illustrated in Fig. 1. The valve C is thus given an opening or closing adjustment as a result of the rotation of the motor effected when the temperature of the thermo-couple D is respectively below or above its normal temperature as determined by the adjustment of the contact 8 of the potentiometer F. The rotation of the motor M in one direction or the other operates through the connection LN to adjust the contact N' in one direction or the other along a resistor 25.

The resistor 25 is connected in parallel with a resistor 26 in a Wheatstone bridge circuit mesh N between the energizing junction points or terminals N² of said mesh. The energizing junction points N² may be connected to any convenient source of alternating current which is of suitable voltage and in suitable phase relation with the alternating current induced in the galvanometer coil G. As diagrammatically illustrated, one of the terminals N² is connected by a conductor 27 to one of the amplifier terminals I⁴ and the second terminal N² is connected to the second terminal I⁴ through a resistor 29. By manual adjustment of a knob 30 more or less of the resistor 29 may be short circuited so as to thereby modify the voltage impressed on the terminals N².

As shown, the contact N' is connected by a conductor 31 to one terminal of the previously mentioned resistor O, which is connected in series with the coil G between the amplifier in the terminals I'. The second terminal of the resistor O is connected by a conductor 32 to the mid-point of the resistor 26. Advantageously, the resistor O has a resistance many times the resistance of the resistors 25 and 26. For example, the resistor O may have a resistance of 5000 ohms and the resistance of each of the resistors 25 and 26 may be of the order of 150–200 ohms.

In normal operation, when the furnace temperature to which the thermo-couple D is responsive is at its normal or control point value determined by the adjustment position of the contact 8, the deflecting galvanometer element EG, the fuel regulator C and the proportioning system contact N' will be in their respective normal or neutral positions. No voltage is generated in the galvanometer coil G when it is in its neutral position, and when the contact N' is in its neutral position it engages the resistor 25 at the point at which the potential is the same as the potential of the mid-point of the resistor 26 to which the conductor 32 is connected.

On an initial departure of the thermo-couple D from its normal value the galvanometer element EG deflects correspondingly and an alternating voltage is then generated in the coil G and is impressed by the latter on the terminals of the amplifier I. The voltage thus impressed by the coil G on the amplifier causes the latter to energize the coil 14 of the switch actuating motor J for operation of the latter in a direction dependent on the direction of the thermo-couple temperature change from normal. If that change is a temperature increase the motor J operates the switch K to energize the relay motor M for rotation in the direction giving a closing adjustment to the regulator valve C. Conversely, if the initial temperature change is a temperature decrease, the motor M is operated to give the valve C an opening adjustment. As the valve C is thus being adjusted in the direction to lower or raise the furnace temperature, the contact N' is adjusted along the resistor 25 in the direction to create a potential difference at the terminals of the resistor O which opposes, i. e., is opposite in phase, to the voltage then being induced in the coil G. The opposing voltage thus impressed on the amplifier input circuit I' builds up as the adjustment of the valve C and contact N' continues, until it becomes equal in magnitude to the voltage induced in the coil G. The amplifier I then ceases to maintain the energization of the coil 14 of the motor J and the biased switch K turns back into its neutral position and thus interrupts the operation of the motor J. The motion of the relay motor is not thus interrupted until the valve C and proportioning bridge contact N' each occupy a position in definite predetermined relation to the deflection of the galvanometer element EG, and hence to the furnace temperature which produces that deflection.

On any further change in either direction of the thermo-couple voltage the motor operates to adjust the valve C until the corresponding adjustment of the contact N' neutralizes the effect on the amplifier input circuit of the change in the voltage induced in the coil G resulting from said further temperature change. Thus for every value of the furnace temperature there is a corresponding definite and predeterminable adjustment position of the fuel regulator valve C, unless and until the valve C reaches one end or the other of its operative range of adjustment at which the motor M interrupts its own operation by opening one or the other of the two limit switches 19 and 23.

The adjustment of the knob 30 and consequent variation in the amount of the resistance 29 in circuit varies, the proportional relation between the deflection movements of the galvanometer element EG and the adjustments of the valve C, and thereby effects what is commonly called a throttle range adjustment of the control apparatus.

As previously stated, the amplifier I may be of any usual or suitable type, and, as shown, it is of a known type and form fully described in my prior Patent No. 2,246,686, granted June 24, 1941. As diagrammatically illustrated in Fig. 2, the amplifier I includes energizing provisions comprising a transformer P having its primary coil connected through the amplifier terminals I³ to the supply conductors L' and L² and having a plurality of secondary windings P', P², P³ and P⁴. The secondary winding P' supplies filament current to the electronic amplifier valves. The secondary winding P² is connected to the anodes of a full wave rectifying tube Q. The secondary winding P³ supplies filament current to the rectifier tube Q. The secondary winding P⁴ is connected to the amplifier terminals I⁴ and supplies energization current to the bridge mesh N.

The amplifier I shown in Fig. 2 comprises an electronic valve R of the heater type pentode, operatively connected to the amplifier input terminals I' by a voltage divider including a resistor 33 and a sliding contact 34 adjustable along the latter, to vary the sensitivity of the control apparatus. The output circuit of valve R is resistance-capacity coupled to the input circuit of a second electronic valve S, also shown as of the heater type pentode. The valve S has its output circuit connected by a transformer T to the input circuits of similar electronic valves U and V each of which is of the heater type tetrode, and preferably of the type known commercially as beam-power amplifier tubes. The valves U and V preferably, and as shown, are connected in push pull. The anodes of the valves U and V are connected to the terminals of the primary of a transformer W, the secondary of which is connected to and energizes the amplifier output terminals I², across which the coil 14 of the motor J is connected.

Except for the inclusion in the transformer P of its secondary winding P⁴, provided to energize the bridge mesh N, the amplifier arrangement shown in Fig. 2 is identical with an amplifier arrangement illustrated and described in detail in my prior Patent No. 2,246,686. Further description herein of the amplifier arrangement shown in Fig. 2 is unnecessary since said arrangement is not claimed herein as novel of itself, and is fully disclosed in my above mentioned patent.

While in accordance with the provisions of the statutes, I have illustrated and described the best form of embodiment of my invention now known to me, it will be apparent to those skilled in the art that changes may be made in the form of the apparatus disclosed without departing from the spirit of my invention, as set forth in the appended claims and that in some cases certain features of my invention may be used to advantage without a corresponding use of other features.

Having now described my invention, what I claim as new and desire to secure by Letters Patent, is:

1. In a control system, the combination with regulating means including a reversible electric relay motor adapted by its operation to adjust a controlled physical condition in selective accordance with the direction and extent of operation of said motor, of means creating an alternating voltage varying in phase with the direction, and in magnitude with the extent, of the departure of a controlling physical condition, related to the first mentioned condition, from a predetermined normal value of said controlling condition, the last mentioned means comprising a coil in an alternating electro-magnetic field and means for turning said coil away from a neutral position relative to said field in one direction or the other in response to a decrease or an increase, respectively, in a continuous voltage which varies according to the variations of said condition from said predetermined value, controlling means responsive to changes in, and including electronic means having an input circuit and an output circuit for amplifying said alternating voltage and operating through said output circuit on a change in said alternating voltage to set the reversible motor into operation to make a regulating adjustment in a direction dependent on the direction of said change, and other means actuated by the first mentioned means to progressively diminish the effect of said alternating voltage on said controlling means as said adjustment of said regulating means continues until the operation of said motor is thereby interrupted, said other means comprising a bridge circuit including resistor and a cooperating contact adjustable along said resistor, means impressing an alternating voltage on said circuit, means for impressing the output voltage of said bridge on said input circuit, and means through which said regulating means, when adjusted, adjusts said contact along said resistor and thereby establishes a voltage neutralizing the first mentioned alternating voltage.

2. In a control system, the combination with regulating means including a reversible electric relay motor, of electronic amplifying means having input and output circuits, means impressing an alternating voltage on said input circuit varying in phase with the direction, and in magnitude with the extent of departure of a physical controlling condition from a predetermined value comprising a coil in an alternating electro-magnetic field and means for turning said coil away from a neutral position relative to said field in one direction or the other in response to a decrease or an increase, respectively, in a continuous voltage which varies according to the variations of said condition from said predetermined value, controlling means responsive to current flow in the output circuit of said electronic amplifying means and actuated thereby on a change in said voltage to set the relay motor into operation to adjust a controlled physical condition, related to the first mentioned condition, in a direction dependent on the direction of said change, and means actuated by the first mentioned means, as the latter is adjusted, to impress a second alternating voltage on said input circuit which opposes and neutralizes the first mentioned voltage and thereby interrupts the operation of said motor comprising a bridge circuit including a resistor and a cooperating contact adjustable along said resistor, means impressing an alternating energizing voltage on said circuit, and means through which said regulating means, when adjusted, adjusts said contact along said resistor and thereby establishes a voltage neutralizing the first mentioned alternating voltage.

3. In a control system, the combination with regulating means including a reversible electric relay motor adapted by its operation to adjust a controlled physical condition in selective accordance with the direction and extent of operation of said motor, of means creating an alternating voltage varying in phase with the direction, and in magnitude with the extent, of the departure of a controlling physical condition, related to the first mentioned condition, from a predetermined normal value of said controlling condition, controlling means responsive to changes in said alternating voltage, and including electronic means having an input circuit and an output circuit for amplifying said alternating voltage and operating through said output circuit on a change in said alternating voltage to set the relay motor into operation in a direction dependent on the direction of said change, and other means actuated by the first mentioned means to progressively diminish the effect of said alternating voltage on said controlling means as the operation of said motor continues until the operation of said motor is thereby interrupted, said other means comprising a bridge circuit including a resistor and a cooperating contact adjustable along said resistor, means impressing an alternating energizing voltage on said bridge circuit, and means for impressing the output voltage of said bridge on said input circuit, and means through which the operation of said motor adjusts said contact along said resistor and thereby establishes a voltage neutralizing the first mentioned voltage.

4. In a control system, the combination with regulating means including a reversible electric relay motor adapted by its operation to adjust a controlled physical condition in selective accordance with the direction and extent of operation of said motor, of means creating an alternating voltage varying in phase with the direction, and in magnitude with the extent, of the departure of a controlling physical condition, related to the first mentioned condition, from a predetermined normal value of said controlling condition, controlling means responsive to changes in said alternating voltage, and including electronic means having an input circuit and an output circuit for amplifying said alternating voltage and operating through said output circuit on a change in said alternating voltage to set the relay motor into operation in a direction dependent on the direction of said change, and other means actuated by the first mentioned means to progressively diminish the effect of said alternating voltage on said controlling means as the operation of said motor continues until the operation of said motor is thereby interrupted, said other means comprising a bridge circuit including a resistor and a cooperating contact adjustable along said resistor, means impressing an alternating energizing voltage on said bridge circuit, and means for impressing the output voltage of said bridge on said input circuit, means through which the operation of said motor adjusts said contact along said resistor and thereby establishes a voltage neutralizing the first mentioned voltage, and means varying the said voltage impressed on said bridge circuit and thereby varying the throttling range of the control system.

HARRY S. JONES.